(12) United States Patent
Eater et al.

(10) Patent No.: US 8,281,400 B1
(45) Date of Patent: Oct. 2, 2012

(54) SYSTEMS AND METHODS FOR IDENTIFYING SOURCES OF NETWORK ATTACKS

(75) Inventors: Benjamin C. Eater, Glenn Dale, MD (US); Robert F. Jaeger, Silver Spring, MD (US)

(73) Assignee: Juniper Networks, Inc., Sunnyvale, CA (US)

( * ) Notice: Subject to any disclaimer, the term of this patent is extended or adjusted under 35 U.S.C. 154(b) by 1690 days.

(21) Appl. No.: 10/234,455

(22) Filed: Sep. 5, 2002

Related U.S. Application Data (60) Provisional application No. 60/397,606, filed on Jul. 23, 2002.

(51) Int. Cl.
*G06F 11/00* (2006.01)

(52) U.S. Cl. ............... 726/25; 726/22; 726/23; 726/24; 705/51; 705/52; 705/53; 705/54; 713/189; 713/190; 713/191; 717/174; 717/175; 717/176; 717/177; 717/178

(58) Field of Classification Search .............. 726/11, 726/22–25; 713/181, 189–191; 705/51–54; 717/174–178
See application file for complete search history.

(56) References Cited

U.S. PATENT DOCUMENTS

| | | | | |
|---|---|---|---|---|
| 6,088,804 A * | 7/2000 | Hill et al. | | 726/25 |
| 6,301,668 B1 * | 10/2001 | Gleichauf et al. | | 726/25 |
| 6,453,345 B2 * | 9/2002 | Trcka et al. | | 709/224 |
| 6,499,107 B1 * | 12/2002 | Gleichauf et al. | | 726/23 |
| 6,886,102 B1 * | 4/2005 | Lyle | | 726/23 |
| 7,028,179 B2 * | 4/2006 | Anderson et al. | | 713/154 |
| 7,043,759 B2 * | 5/2006 | Kaashoek et al. | | 726/25 |
| 7,051,369 B1 * | 5/2006 | Baba | | 726/23 |
| 7,080,161 B2 * | 7/2006 | Leddy et al. | | 709/250 |
| 2001/0039623 A1 * | 11/2001 | Ishikawa | | 713/201 |
| 2002/0016926 A1 | 2/2002 | Nguyen et al. | | 713/201 |
| 2002/0032854 A1 | 3/2002 | Chen et al. | | 713/151 |
| 2002/0101819 A1 | 8/2002 | Goldstone | | 370/229 |
| 2002/0107953 A1 * | 8/2002 | Ontiveros et al. | | 709/224 |
| 2002/0157020 A1 | 10/2002 | Royer | | 713/201 |
| 2002/0166063 A1 * | 11/2002 | Lachman et al. | | 713/200 |
| 2003/0029703 A1 * | 2/2003 | Miyako et al. | | 200/61.54 |
| 2003/0039245 A1 | 2/2003 | Khosravi et al. | | 370/389 |
| 2003/0065948 A1 | 4/2003 | Wilkes | | 713/201 |
| 2003/0167404 A1 * | 9/2003 | Han et al. | | 713/201 |
| 2003/0229703 A1 * | 12/2003 | Falola et al. | | 709/229 |

OTHER PUBLICATIONS

Co-pending U.S. Appl. No. 10/431,395, filed May 8, 2003; Ross W. Callon et al.; "Rate Limiting Data Traffic in a Network," pp. 1-56 (specification); Figs. 1-13 (13 pages). U.S. Appl. No. 10/080,865; filed Feb. 21, 2002; Ross W. Callon; "Distributed Filtering for Networks;" pp. 1-40 (specification); Figs. 1-11 (11 pages).
U.S. Appl. No. 10/281,446; filed Oct. 25, 2002; Scott Mackie; "Dynamically Inserting Filters Into Forwarding Paths of a Network Device;" pp. 1-17 (specification); Figs. 1-4 (4 pages).
Steve Gibson; DRDoS; Distributed Reflection Denial of Service; Gibson Research Corporation; http://grc.com/dos/drdos.htm; Feb. 22, 2002; pp. 1-24.

* cited by examiner

*Primary Examiner* — Edan Orgad
*Assistant Examiner* — Roderick Tolentino
(74) *Attorney, Agent, or Firm* — Harrity & Harrity, LLP (57) ABSTRACT

Methods and systems for identifying a source of an attack in a network include transmitting an address associated with the attack target to a number of network devices. Each network device may then determine whether a received packet is destined for the attack target and identify, for each packet destined for the attack target, an input interface upon which the packet arrived. Each network device may also count the amount of data destined for the attack target per input interface. A potential source of the attack may then be identified based on the amount of data destined for the attack target.

20 Claims, 6 Drawing Sheets

SYSTEMS AND METHODS FOR IDENTIFYING SOURCES OF NETWORK ATTACKS

RELATED APPLICATIONS

This application claims priority under 35 U.S.C. §119 based on U.S. Provisional Application Ser. No. 60/397,606, filed Jul. 23, 2002, the disclosure of which is incorporated herein by reference.

This application is related to the following commonly-assigned, copending U.S. application Ser. No. 10/080,865, filed Feb. 21, 2002, entitled "DISTRIBUTED FILTERING FOR NETWORKS."

BACKGROUND OF THE INVENTION

1. Field of the Invention

The present invention relates generally to data networks and, more particularly, to identifying sources of network attacks.

2. Description of Related Art

Network attacks, such as distributed denial of service (DDoS) attacks, present unique source identification and tracking problems for a service provider. At the victim's location, an attack may be discovered when hundreds or thousands of compromised systems initiate a surge of packets with the destination address of one or more servers within the victim's network. The intent of these packets may be to crash the victim(s) servers (as with a SYN attack), consume all bandwidth between the victim and the Internet, or reduce the ability of the victim to provide its intended service.

A properly constructed DDoS attack may overwhelm computer and network systems at the victim's network and may only require a few hundred attacking systems to knock a large network off the Internet. The use of multiple attacking systems at multiple sites significantly increases the amount of time needed to fully identify the sources of the attack and stop the attack.

Conventional approaches to locating the sources of a DDoS attack take a considerable amount of time and have a number of drawbacks. For example, once an attack has been detected, the victim and/or the service provider may attempt to identify the sources of the attack via a manual process involving capturing packets at the closest router to the victim. An operator may then try to trace the sources of these packets to identify their origination point. Since source addresses can be spoofed, however, it may be difficult to determine the actual sources of the attack. The operator may then attempt to manually backtrack to those routers that forwarded the packet to the service provider serving the victim, based on the interfaces on which the attack arrived. This backtracking operation is typically performed recursively until the source routers are identified. One drawback with this approach is that hop-by-hop backtracking is a time consuming process.

Other conventional approaches associated with source identification and mitigation of DDoS attacks include black hole routing, sink hole routing, and backscatter. In black hole routing, a border gateway protocol (BGP) route is used to indicate that all traffic destined to the attack target should be dropped at the ingress. This quickly removes the traffic from the service provider's backbone, but does not identify the sources of the attack. In addition, legitimate traffic is blocked from reaching the attack target.

In sink hole routing, a BGP route is used to indicate that all traffic destined to the attack target should be re-routed to a special device that can then analyze the traffic. However, if the source addresses are spoofed, the special device will be unable to identify the sources of the attack. This approach also requires that legitimate traffic be dropped.

Backscatter is similar to black hole routing, except it uses Internet Control Message Protocol (ICMP) unreachable messages to help identify the sources. The backscatter approach assumes the attacker is spoofing source addresses and that by advertising bogus routes internally, the service provider can attract some of these ICMP unreachable messages for analysis. If the attacker doesn't use address spoofing, or spoofs from valid Internet addresses, all of the ICMP messages will be sent back to the attacker or to other points on the Internet and cannot be analyzed. This technique also requires that legitimate traffic destined to the attack target be dropped while the attack is analyzed.

Each technique described above takes the approach of denying all traffic destined to the victim. In essence, each of these approaches effectively says that if the victim is already off-line as a result of the attack, these mechanisms for tracing the attack will not negatively impact the victim's current situation.

Therefore, there exists a need for systems and methods that identify sources of Internet attacks so that the attacks can be thwarted, while allowing customer interfaces with legitimate traffic to be unaffected.

SUMMARY OF THE INVENTION

Systems and methods consistent with the present invention address this and other needs by automating the process for identifying sources of attacks by advertising the address of the attack target to a number of routers. The routers then keep traffic statistics associated with traffic destined for the attack target. The traffic statistics may then be analyzed to determine at what point(s) the attack is entering the network. Actions may then be taken to filter the attack.

In accordance with the principles of the invention as embodied and broadly described herein, a method for identifying a source of attack in a network is provided. The method includes transmitting an address associated with an attack target to a network device and determining, by the network device, whether received data is destined for the attack target, where the network device includes a number of input interfaces. The method also includes identifying an input interface upon which data destined for the attack target arrived and monitoring, for each input interface, data destined for the attack target. The method further includes identifying a potential source of the attack based on the monitoring.

In another implementation consistent with the principles of the invention, a network device is provided. The network device includes a number of input interfaces, where each input interface is configured to receive data. The network device also includes logic configured to receive address information associated with an attack target and identify data destined for the attack target based on the received address information. The logic is also configured to monitor data destined for the attack target per input interface.

In a further implementation consistent with principles of the invention, a computer-readable medium having stored sequences of instructions is provided. The instructions, when executed by a processor, cause the processor to receive traffic information from a number of network devices, where each network device includes a number of input interfaces. The instructions also cause the processor to display the traffic information identifying an amount of traffic per input interface for each of the network devices.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Figure 1:
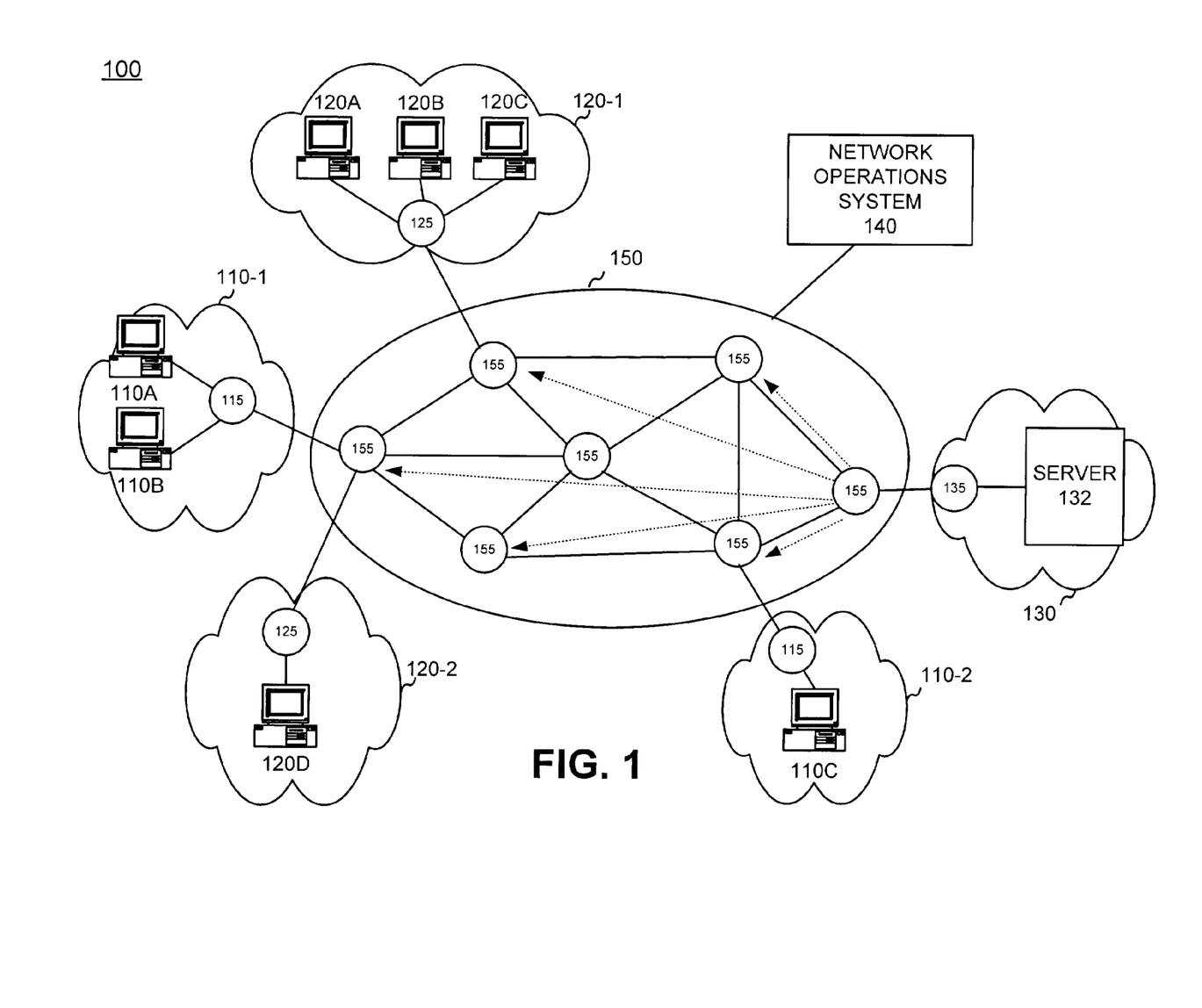
FIG. 1 is a diagram of an exemplary network in which methods and systems consistent with principles of the invention may be implemented.

FIG. 1 illustrates an exemplary network in which methods and systems consistent with the principles of the invention may be implemented. Network 100 includes a number of user networks 110, attacker networks 120, a victim 130, a network operations system 140 and network 150. Each of the circles in FIG. 1 may represent a router or other network device, such as a switch, for communicating via a network, such as network 150. User networks 110 may include one or more computing devices, such as personal computers, laptops, personal digital assistants (PDAs) or similar devices with a connection to network 150. For example, user network 110-1 may include computing devices 110A and 110B connected to network 150 via router 115 and user network 110-2 may include computing device 110C connected to network 150 via router 115. User networks 110 may transmit/receive legitimate traffic to/from victim 130 over network 150 via wired, wireless or optical connections.

Attacker networks 120 may represent one or more computing devices that may be used to attack a victim, such as victim 130. Attacker networks 120 include a number of computing devices that may be used to launch an attack, such as a DDoS attack. For example, attacker network 120-1 may include computing devices 120A-C connected to network 150 via router 125 and attacker network 120-2 may include computing device 120D connected to network 150 via router 125. Attacker networks 120 transmit packets to victim 130 via network 150.

Victim 130 may include one or more computing devices connected to network 150. For example, victim 130 may include server 132 connected to network 150 via router 135. Victim 130 may communicate with users, such as users in user networks 110 and attacker networks 120, via network 150.

Network operations system 140 may include one or more computing devices/platforms associated with a service provider that provides network-related services associated with network 150 for victim 130. For example, network operations system 140 may monitor components of network 150 involved in transmitting data to/from victim 130.

Network 150 may include the Internet, a local area network (LAN), wide area network (WAN), intranet, another type of network, or a combination of these. Network 150 may include a variety of network devices, including a number of routers 155 that route data. The routers 155 that face outside networks (i.e., networks 110 and 120, also referred to as edge routers) may be configured to detect traffic destined for victim 130, as described in more detail below. For simplicity, only two user networks 110, two attacker networks 120 and several routers are shown in FIG. 1. It should be understood that additional user networks 110, attacker networks 120, and routers 155 may be included in network 100.

Figure 2:
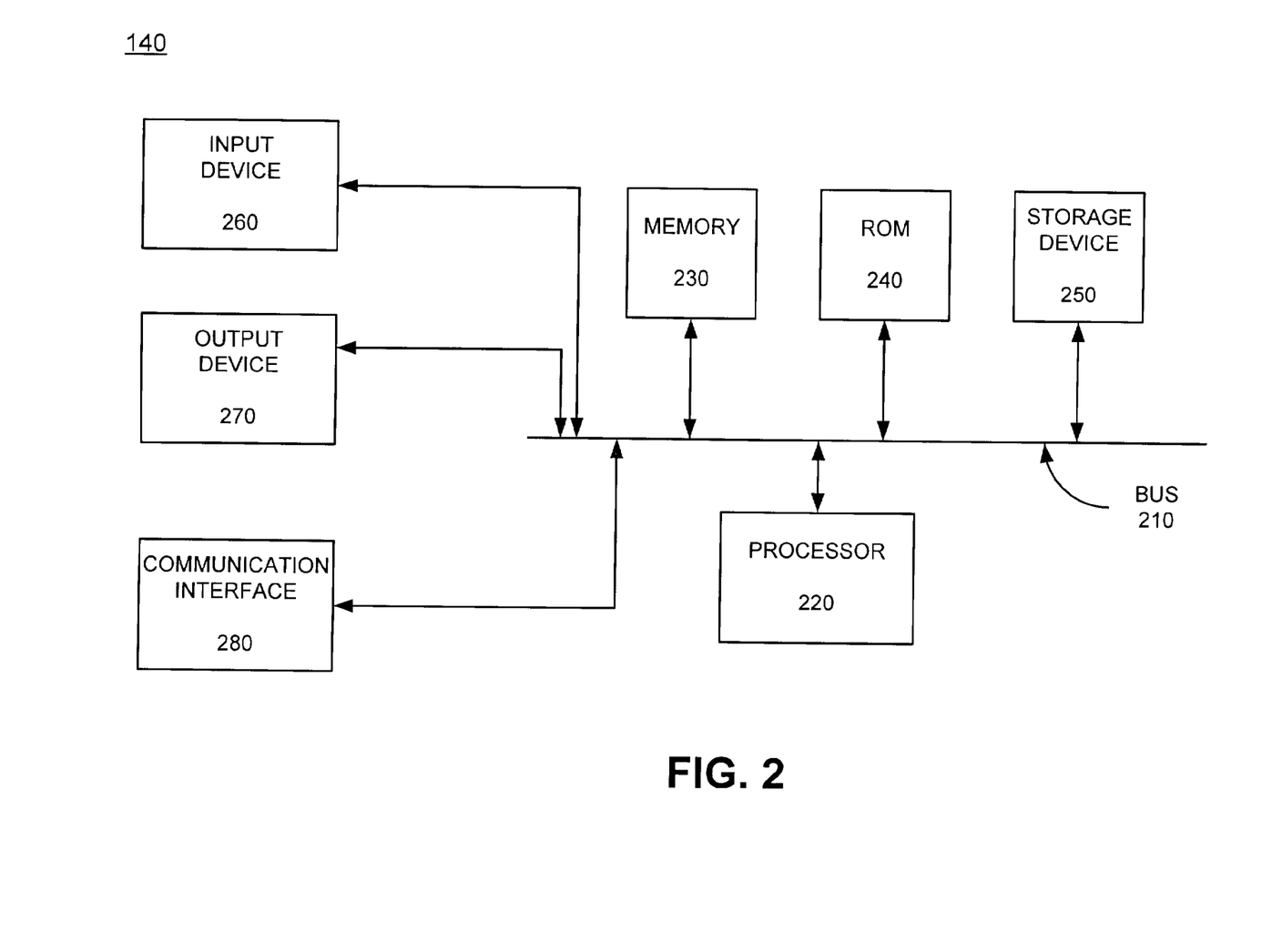
FIG. 2 is an exemplary diagram of a network operations system of FIG. 1 consistent with principles of the invention.

FIG. 2 is an exemplary diagram of the network operations system 140 of FIG. 1 consistent with principles of the invention. Network operations system 140 includes a bus 210, a processor 220, a main memory 230, a read only memory (ROM) 240, a storage device 250, an input device 260, an output device 270, and a communication interface 280. Bus 210 permits communication among the components of network operations system 140.

Processor 220 may include any type of conventional processor or microprocessor that interprets and executes instructions. Main memory 230 may be a random access memory (RAM) or another type of dynamic storage device that stores information and instructions for execution by processor 220. Main memory 230 may also store temporary variables or other intermediate information used during execution of instructions by processor 220. ROM 240 may include a conventional ROM device or another type of static storage device that stores static information and instructions for processor 220. Storage device 250 may include any type of magnetic or optical recording medium and its corresponding drive, such as a magnetic disk or optical disk and its corresponding disk drive.

Input device 260 may include any conventional mechanism that permits an operator to input information to network operations system 140, such as a keyboard, a mouse, a pen, voice recognition and/or biometric mechanisms, etc. Output device 270 may include any conventional mechanism that outputs information to the operator, including a display, a printer, one or more speakers, etc. Communication interface 280 may include any transceiver-like mechanism that enables network operations system 140 to communicate with other devices and/or systems. For example, communication interface 280 may include a modem or an Ethernet interface for communicating via a LAN. Alternatively, communication interface 280 may include other mechanisms for communicating via a network, such as network 150.

Network operations system 140, consistent with the present invention, performs operations associated with identifying attackers in response to processor 220 executing sequences of instructions contained in a computer readable medium, such as memory 230. A computer-readable medium may include one or more memory devices and/or carrier waves. Such instructions may be read into memory 230 from another computer-readable medium, such as a data storage device 250, or from a separate device via communication interface 280. Execution of the sequences of instructions contained in memory 230 causes processor 220 to perform the process steps that will be described hereafter. In alternative embodiments, hard-wired circuitry may be used in place of or in combination with software instructions to implement the present invention. Thus, the present invention is not limited to any specific combination of hardware circuitry and software.

Exemplary Network Device Configuration

Figure 3:
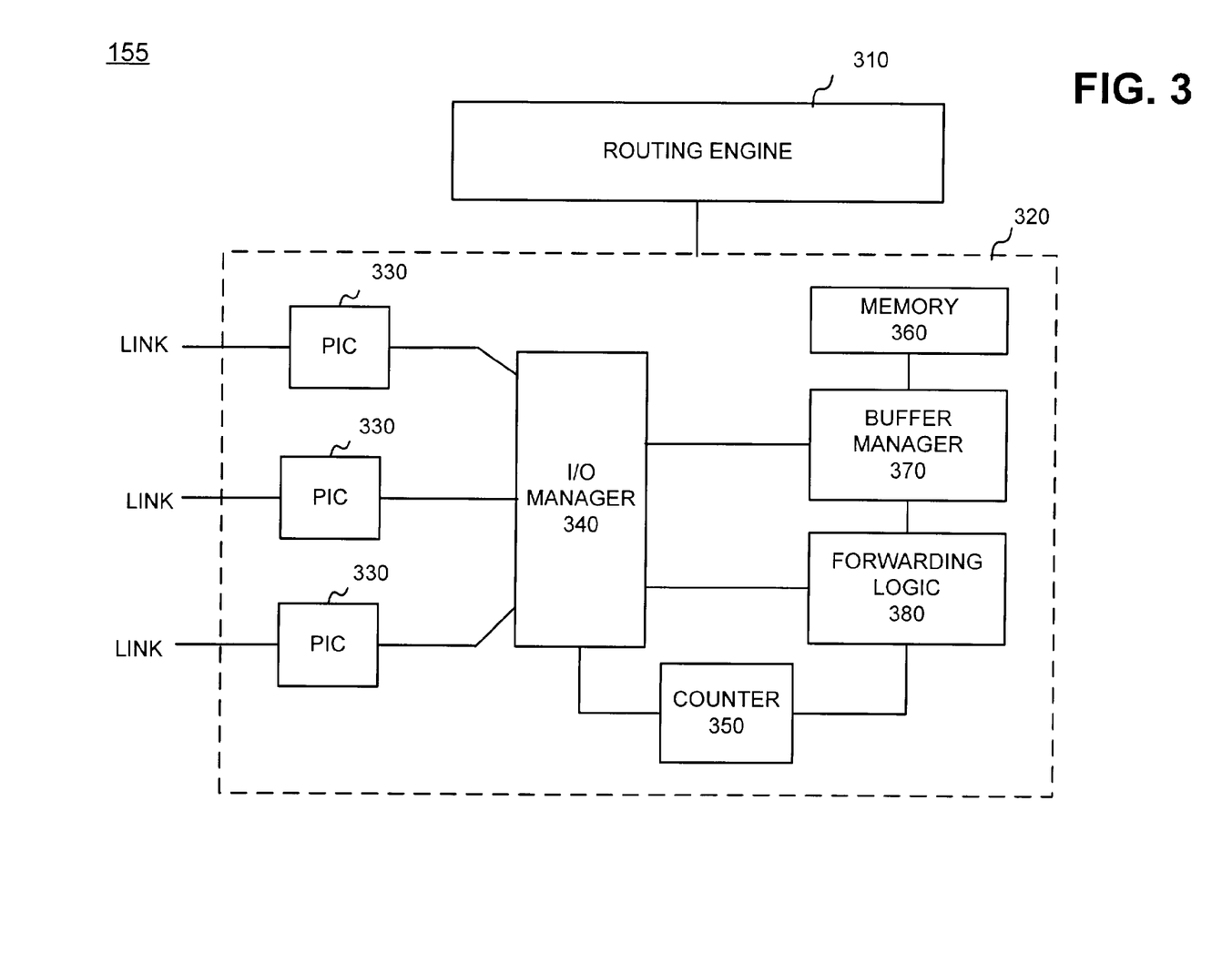
FIG. 3 is a diagram of an exemplary router of FIG. 1 according to an implementation consistent with principles of the invention.

FIG. 3 is a diagram of an exemplary router 155 of FIG. 1 in which systems and methods consistent with principles of the invention may be implemented. Router 155 may include a routing engine (RE) 310 and a packet forwarding engine (PFE) 320. RE 310 may include processing logic that performs high-level management functions for router 155. For example, RE 310 may communicate with other networks and systems connected to router 155 to exchange information regarding network topology and network protocol information. RE 310 may create routing tables based on network topology information, create forwarding tables based on the routing tables and send the forwarding tables to PFE 320. PFE 320 uses the forwarding tables to perform a route lookup for incoming packets.

PFE 320 may receive one or more packet streams on physical links connected to a network, such as a WAN, LAN, the Internet, wireless network, or other type of network. Each physical link could be one of many types of transport media, such as optical fiber or Ethernet cable. The packets on the physical link may be formatted according to one of several protocols, such as the synchronous optical network (SONET) standard or Ethernet.

PFE 320 processes the stream(s) to determine destination information and transmits the stream(s) on one or more links based on the destination information. In an exemplary implementation, PFE 320 may include a number of physical interface cards (PICs) 330, an I/O manager 340, a counter 350, a memory 360, a buffer manager 370 and forwarding logic 380. It should be understood that PFE 320 may include additional or other devices. For example, while three PICs 330 are shown in FIG. 3, there may be more or fewer PICs in other implementations.

In an exemplary implementation, PICs 330 connect to physical links and I/O manager 340 to transport data between the physical links and I/O manager 340. Each of PICs 330 includes interfacing, processing, and memory elements necessary to transmit data between a physical link and I/O manager 340. In addition, each of PICs 330 may be designed to handle a particular type of physical link. For example, a particular PIC may be provided to handle only Ethernet communications. In each case, PICs 330 may pass the packets to I/O manager 340 for further processing. For outgoing data, PICs 330 may receive packets from I/O manager 340 and transmit packets on the physical link.

I/O manager 340 may process data flowing in two directions: a first direction corresponding to processing packet data received from PICs 330 and a second direction corresponding to processing packet data received from buffer manager 370 or forwarding logic 380. In the first direction, I/O manager 340 may process packets received from one of the PICs 330, convert the packets into data units, and transmit the data units to buffer manager 370. Data units are the data structures used internally by PFE 320 for transporting and storing data. In one implementation, data units are 64 bytes in length. For outgoing data, I/O manager 340 reassembles data units into data packets for output via one of PICs 330.

In an exemplary implementation, buffer manager 370 and forwarding logic 380 form a switching and forwarding module that process the data packets received from I/O manager 340. Buffer manager 370 receives the data units and stores the data units in memory 360. Memory 360 may be implemented as one or more memory devices, although only one is shown in FIG. 3 for simplicity. Buffer manager 370 also extracts control information associated with a data packet. In an exemplary implementation, the control information may include the header of the data packet (e.g., an IP header) that includes the source and destination of the packet. The control information may also include information indicating the location of each data unit of the packet stored in memory 360. In one implementation, instead of storing addresses in the control information, only the address of the first data unit is stored in the control information, and the remaining data unit locations are identified in the control information by offsets from the address of the preceding data unit. The control information may further include other information, such as the protocol of the packet, quality of service (QoS) information, validity information, priority information, and data length information.

After storing the data units in memory 360 and extracting the control information, buffer manager 370 sends the control information to forwarding logic 380. Forwarding logic 380 may perform a route lookup based on the packet header information included in the control information to identify the destination for the packet. Forwarding logic 380 forwards the destination information to I/O manager 340, which reassembles the data packet and forwards the data packet to an appropriate one of PICs 330.

Counter 350 may count packets received by router 155 that are destined for a particular target, such as victim 130. In an exemplary implementation consistent with principles of the invention, counter 350 may count the number of packets and the number of bytes of data destined for a particular target for each of the input interfaces of router 155. For example, each PIC may represent an input interface and the total number of input interfaces supported by router 155 may be 128. Alternatively, router 155 may support more or fewer input interfaces. In any event, in an exemplary implementation, counter 350 may increment a count value associated with a particular input interface on which a packet destined for the attack target was received.

Figure 4:
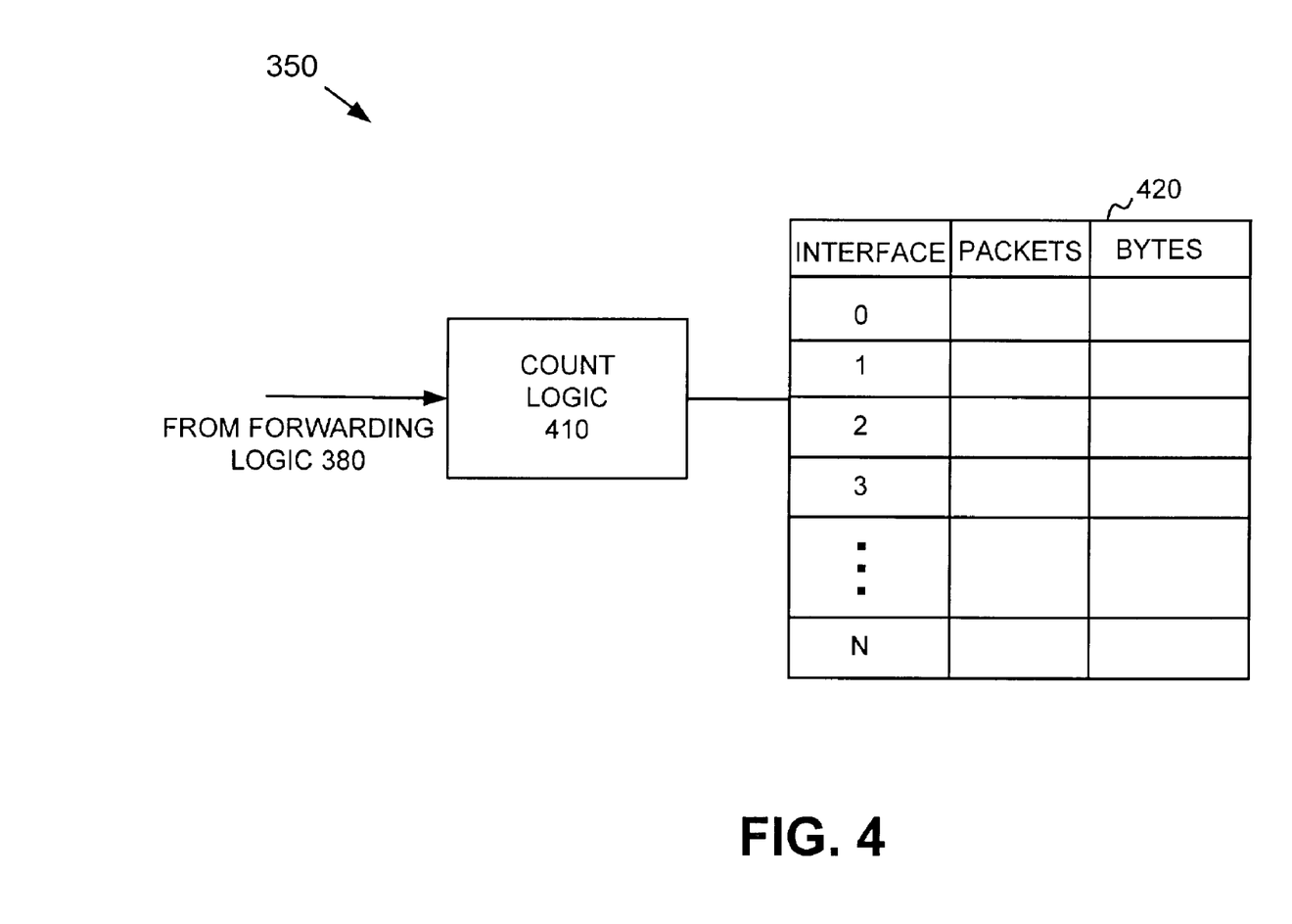
FIG. 4 is an exemplary diagram of a portion of the counter unit of FIG. 3 according to an implementation consistent with principles of the invention.

FIG. 4 illustrates a portion of counter 350 consistent with principles of the invention. Counter 350 includes count logic 410 and count table 420. Count logic 410 receives information from forwarding logic 380 and increments the appropriate entries in count table 420. As illustrated in FIG. 4, count table 420 includes a "packets" entry and a "bytes" entry for each of the "N" input interfaces on router 155. Count logic 410 updates these entries to indicate the number of packets and corresponding number of bytes that are destined for an attack target, as described in more detail below. This information may then be used to identify sources of the attack.

Exemplary Processing

Figure 5:
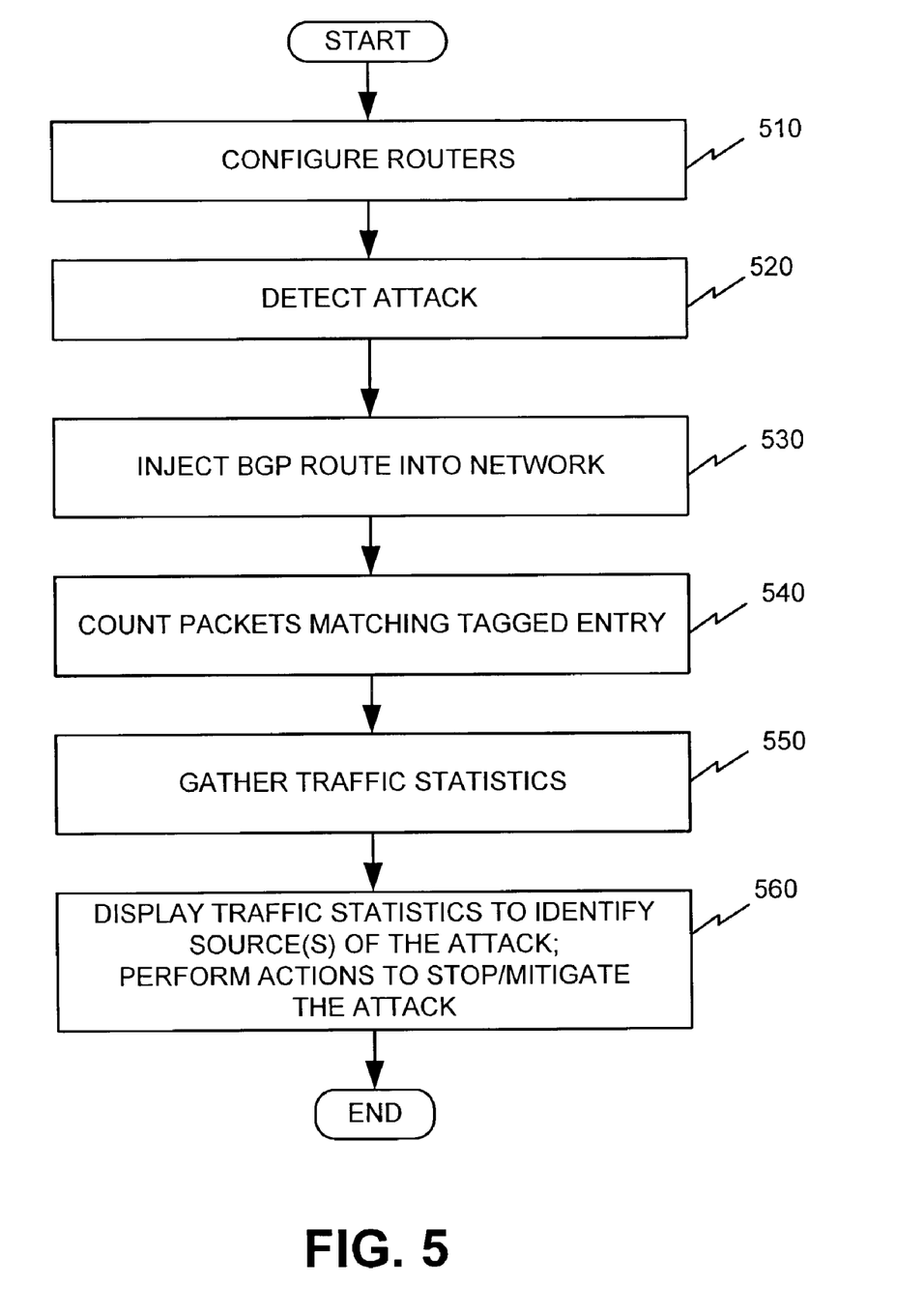
FIG. 5 is a flow diagram of exemplary processing according to an implementation consistent with principles of the invention.

FIG. 5 is a flow diagram illustrating exemplary processing associated with identifying source(s) of attack and filtering the attack traffic according to an implementation consistent with principles of the invention. Processing may begin by pre-configuring routers 155 (FIG. 1) with a policy that matches BGP routes that belong to a certain community and classifies those routes into a destination class usage (DCU)

destination class (act 510). DCU may then be enabled on all interfaces connected to outside networks, such as networks 110 and 120.

For example, each edge router 155 (i.e., a router connected to an outside network) in network 150 may be configured with a policy that assigns routes tagged with a certain community to the destination class "DDOS." The policy is also applied to the forwarding table in the edge routers 155 to enable tracking of packets to identify an attack.

Next, assume that victim 130 detects an attack (act 520). As described previously, an attack may be detected using an intrusion detection system or some other conventional mechanism. For example, the attack may be detected manually when victim 130 determines that server 132 is receiving a much larger amount of traffic than it typically receives. In any event, once the attack is detected, victim 130 notifies the service provider associated with network 150 that an attack is occurring. Network operations system 140 or victim 130 may then inject a BGP route in network 150 (act 530).

In an exemplary implementation, the BGP route may be injected into the router located closest to the attack target. The BGP route may advertise the address of the attack target, typically a 32 bit prefix of the attack target's address, along with a community tag indicating that this route belongs to the DDoS destination class. The BGP route may also indicate that the route is a no-export community route. That is, the BGP route is an internal BGP (iBGP) route and should not be exported to any external BGP peers (i.e., routers outside of network 150).

For example, assume that victim 130 has an Internet Protocol (IP) address of 128.8.128.80 and the community tag of 100:1000 is associated with the DDoS destination class. In this case, the host route of 128.8.128.80 is advertised with the community tag of 100:1000 in iBGP to routers 155, as indicated by the dotted lines in FIG. 1. In this scenario, all the edge routers in network 150 receive a 32-bit IP address associated with victim 130 (i.e., 128.8.128.80), along with community tag 100:1000. Routers 155 are configured to recognize, based on the community tag of 100:1000, that DDoS tracking should be performed with respect to the 32-bit IP destination address.

After the tagged route has been propagated to the appropriate routers, each of the routers 155 that received the IP address may begin counting the packets that match the tagged entry in its routing table (act 540). For example, returning to FIG. 3, when a packet arrives on one of routers 155, PICs 330 receive the packets and forwards the packet to I/O manager 340, where it is forwarded to buffer manager 370. Buffer manager 370, as described previously, stores the packet in memory 360 and passes control information that includes IP header information to forwarding logic 380.

Forwarding logic 380 identifies destination information for the packet. In an exemplary implementation consistent with principles of the invention, when the destination information for the packet matches the tagged entry in the routing table of router 155 (i.e., the BGP route received at act 530), forwarding logic 380 sets a bit in the control information to indicate that the packet is destined for the attack target. Count logic 410 examines this bit and the rest of the control information and increments the appropriate values in count table 420. For example, if the control information indicates that one packet of 50 bytes has been received on input interface 1, count logic 410 increments the "packets" entry and "bytes" entry in count table 420 for interface 1 by "1" and "50," respectively. In this manner, router 155 is able to track the point at which traffic destined for victim 130 is entering network 150. Network management analysis tools can then be used to identify interfaces on which attack traffic may be arriving and the rates of traffic destined to the attack target from the respective interfaces.

For example, returning to FIG. 1, network operations system 140 may gather statistics associated with network traffic after the attack has been detected and the address of victim 130 has been advertised (act 550). In an exemplary implementation, network operations system 140 may poll routers 155 at predetermined intervals to obtain network traffic data. Network operations system 140 may communicate with routers 155 using, for example, Perl scripts that perform simple network management protocol (SNMP) "gets" over secure channels to retrieve the network traffic data associated with victim 130. Alternatively, routers 155 may transmit the traffic data to network operations system 140 at predetermined intervals.

Figure 6:
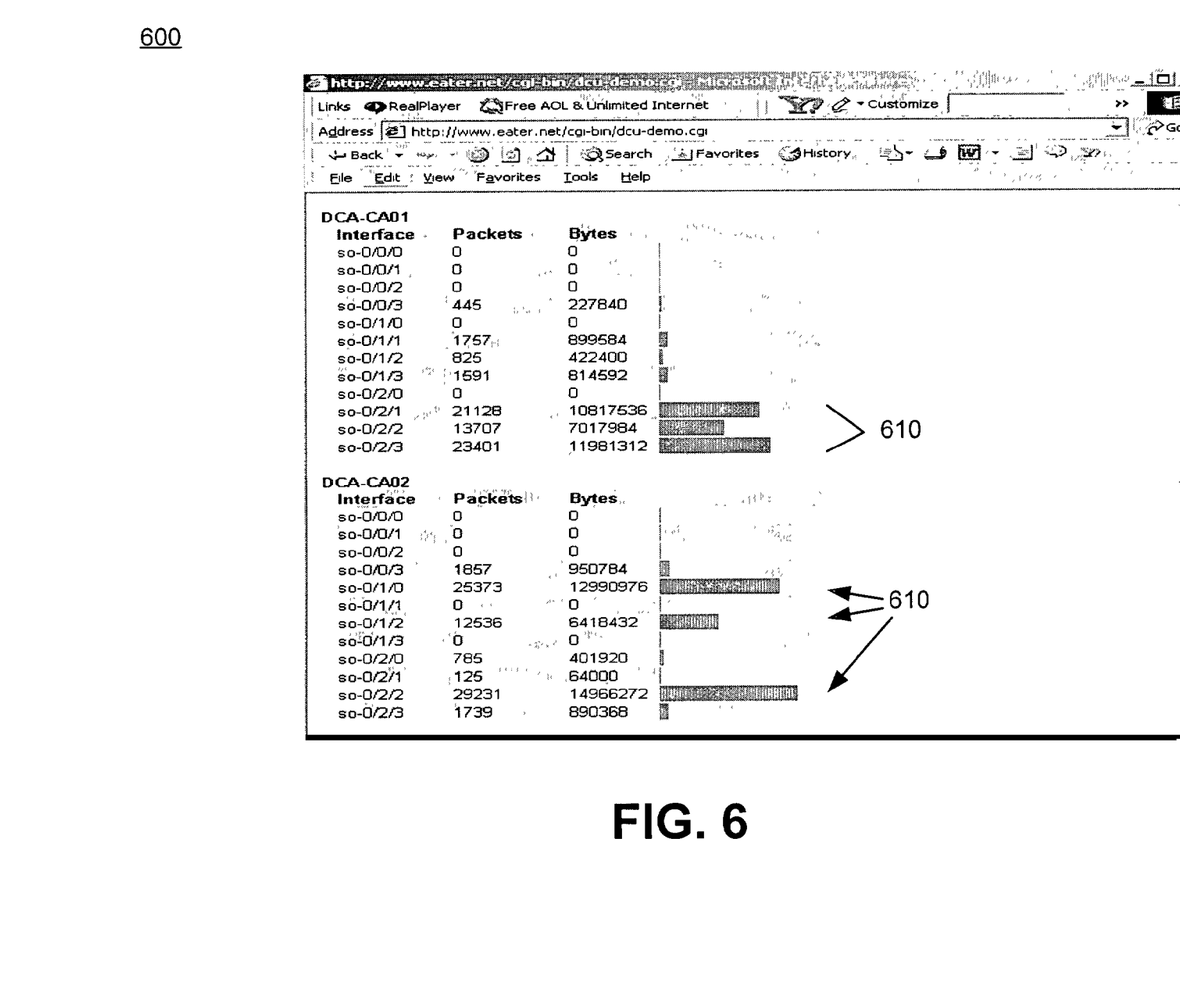
FIG. 6 illustrates an exemplary graphical user interface screen displayed by the network operations system of FIG. 1 consistent with principles of the invention.

Network operations system 140 may display the traffic statistics to identify sources or potential sources of the attack (act 560). For example, FIG. 6 illustrates an exemplary graphical user interface (GUI) screen displayed by network operations system 140 after retrieving the network traffic data. GUI 600 may display traffic information regarding network 150, such as the number of packets and the number of bytes for each interface for each of routers 155 that gather the traffic data. By viewing GUI 600, an operator can quickly identify the interfaces on which the attack is entering network 150. For example, in screen 600, the interfaces identified by 610 show a higher volume or rate of traffic, as evidenced by the much larger number of packets and bytes than the other interfaces. These interfaces may be identified as sources or potential sources of the attack. In other implementations, network operations system 140 may be configured to automatically identify the potential sources of attack based on the number of packets/bytes of data received on the various input interfaces. In either case, the service provider may then take appropriate action to stop the attack or mitigate the effects of the attack (act 560). The action may be automatic, performed by a network administrator, or some combination of these.

For example, network operations system 140 may signal one or more of routers 155 to discard all packets that enter on a particular input interface that has been identified as a potential source of the attack. When the router receives a packet on that particular interface, it may send an ICMP message to the source address of the denied packet. In this manner, routers 155 may reject only packets received on interfaces identified as being associated with the attack, while allowing traffic received on other interfaces to be forwarded on to victim 130.

Sending an ICMP message to the source address of a packet that was received on an interface designated as an attack source may have the desired effect of stopping those packets from reaching victim 130. However, sending such messages may cause a disruption to a user/network whose address may have been spoofed or was an unwilling participant in the attack.

To avoid unnecessarily impacting innocent users, network operations system 140 may signal one or more of routers 155 to silently discard packets. That is, routers 155 may discard packets without sending packets or information back to the source address in the attack packets, thereby saving processing time by avoiding sending messages to the sources of the attack packets. Additionally, since no packets are sent to the source address in the attack packets, routers 155 themselves do not become the source of an attack on the source address specified in the attack packets via an attack known as a reflection attack.

Network operations system 140 may also signal one or more of routers 155 to rate limit packets from interfaces identified as attack interfaces. In this scenario, a router may allow some portion of the traffic from an attack interface to be forwarded to victim 130. In other words, a router may slow the rate and/or volume of traffic received on an attack interface from reaching victim 130. This may allow an operator at network operations system 140 to obtain more information on the attack, while allowing some traffic that may be legitimate to reach victim 130.

It should be understood that routers 155, consistent with principles of the invention, may perform other operations/measures to stop or mitigate the effects of a network attack.

CONCLUSION

Systems and methods consistent with the principles of the invention provide a mechanism for efficiently identifying sources of network attacks. The sources of attack may be localized to a number of interfaces based on traffic related statistics gathered by routers 155. This enables routers 155 to stop or limit the amount of traffic from these interfaces from reaching victim 130, while allowing other traffic to pass.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, in the exemplary implementation described above, network operations system 140 receives traffic data from routers 155 and identifies sources of the attack. In alternative implementations, routers 155 themselves may be configured to identify the sources of attack based on the volume and/or rate of traffic destined for the attack target received on each of their input interfaces. In this implementation, when an input interface on one or more of routers 155 receives more than a predetermined amount of traffic destined for victim 130, those routers may take steps to stop the traffic or reduce the amount of traffic received on that interface from reaching victim 130.

Also, systems and methods consistent with the invention have been described as processing data packets. In alternative implementations, systems and methods consistent with principles of the invention may process other, non-packet data. In addition, certain portions of the invention have been described as "logic" that performs one or more functions. This logic may include hardware, such as an application specific integrated circuit (ASIC) or a field programmable gate array (FPGA), software or a combination of hardware and software. Further, while a series of acts has been described in relation to FIG. 5, the order of the acts may vary in other implementations when a particular order is not required and non-dependent acts may be performed in parallel. In addition, while systems and methods have been described in terms of a network device, such as a router, the present invention may have applicability in other devices, such as switches, which may be involved in routing data to an attack victim. Lastly, while some processing has been described as being performed by particular components of the network device, it should be understood that the processing described as being performed by one component may be performed by other components in alternative implementations of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for identifying a source of an attack in a network, comprising:
    transmitting, to a network device implemented at least partially in hardware, a Border Gateway Protocol (BGP) route that identifies an address of an attack target, and a BGP community tag representing a destination class associated with the attack;
    configuring, based on the BGP community tag, the network device with a policy that assigns the route to the destination class associated with the attack;
    determining, by the network device and in response to configuring the network device with the policy, if data is destined for the attack target;
    monitoring, based on the destination class and for each input interface of a plurality of input interfaces of the network device, data destined for the attack target;
    determining, by the network device, a potential source of the attack based on the monitoring, the potential source of the attack being associated with at least one of the plurality of input interfaces;
    filtering, by the network device, data received on the at least one of the plurality of input interfaces that receives the data destined for the attack target; and
    not filtering, by the network device, data received on at least one of the plurality of input interfaces that does not receive the data destined for the attack target.

2. The method of claim 1, where the identifying a potential source of the attack comprises:
    identifying the at least one input interface, of the plurality of input interfaces.

3. The method of claim 1, further comprising:
    polling the network device to obtain results of the monitoring; and
    generating a user interface that includes information associated with the results of the monitoring.

4. The method of claim 1, where the filtering comprises:
    preventing data received on the at least one of the plurality of input interfaces from reaching the attack target.

5. The method of claim 1, where the filtering comprises:
    limiting an amount of traffic received on the at least one of the plurality of input interfaces that receives the data from reaching the attack target.

6. The method of claim 1, further comprising:
    applying the policy to a forwarding table in the network device.

7. The method of claim 1, further comprising:
    sending attack-related information to the network device, the attack-related information identifying at least the at least one of the plurality of input interfaces on the network device; and
    filtering, by the network device, data received on the at least one of the plurality of input interfaces in response to the attack-related information.

8. A network device implemented at least partially in hardware, the network device comprising:
    a plurality of input interfaces to receive data; and
    logic, implemented at least partially in hardware, to:
        receive address information identifying an attack target, the address information including a Border Gateway Protocol (BGP) route and a BGP community tag associated with the route, where the BGP community tag is used to configure the network device with a policy that assigns the route to a destination class associated with an attack;

identify the BGP community tag,
assign, based on the BGP community tag, the BGP route identifying the attack target to the destination class associated with the attack,
identify data destined for the attack target based on the BGP community tag, and
monitor, using the destination class, data destined for the attack target received by at least one input interface of the plurality of input interfaces.

9. The network device of claim 8, where, when monitoring data destined for the attack target, the logic is to:
identify the at least one input interface, of the plurality of input interfaces, that receives the data destined for the attack target, and
count at least one of a number of packets or a number of bytes of data destined for the attack target received by the at least one input interface.

10. The network device of claim 9, where the logic is further to:
identify at least one potential source of an attack based on at least one of the counted number of packets or the counted number of bytes of data.

11. The network device of claim 8, where the logic is further to:
transmit information regarding the data destined for the attack target to an external device.

12. The network device of claim 8, where the logic is further to:
receive a request from an external device for traffic-related data associated with the attack target, and
transmit information regarding the data destined for the attack target to the external device in response to the request.

13. The network device of claim 12, where the logic is further to:
receive attack information from the external device, the attack information identifying the at least one input interface, of the plurality of input interfaces, associated with a potential source of attack, and
filter data received on the at least one input interface in response to the attack information.

14. The network device of claim 8, where the logic is further to:
identify the at least one input interface, of the plurality of input interfaces, as a potential source of an attack based on at least one of a counted number of packets or a counted number of bytes of data, and
filter packets received on the at least one input interface.

15. The network device of claim 14, where when filtering packets, the logic is to:
prevent data received on the at least one input interface, of the plurality of input interfaces, from reaching the attack target.

16. The network device of claim 14, where when filtering packets, the logic is to:
limit an amount of traffic from the at least one input interface, of the plurality of input interfaces, from reaching the attack target.

17. A method for processing data in a network device, implemented at least partially in hardware and having a plurality of input interfaces, the method comprising:
receiving address information identifying an attack target, the address information being associated with a Border Gateway Protocol (BGP) route and a BGP community tag, where the BGP community tag represents a destination class associated with an attack;
configuring, based on the BGP community tag, the network device with a policy that assigns the BGP route to the destination class associated with the attack;
receiving data at the network device;
determining, in response to configuring the network device with the policy, whether the data is destined for the attack target;
changing a count value when the data is destined for the attack target;
identifying a source of an attack based on the count value, the identified source comprising at least one input interface, of the plurality of input interfaces, on the network device;
limiting an amount of traffic from the at least one input interface from reaching the attack target; and
allowing traffic on at least one other input interface, of the plurality of input interfaces network device, to be forwarded to the attack target.

18. A network device, comprising:
a plurality of input interfaces; and
logic, implemented at least partially in harware, to:
receive information including an address identifying an attack target, the address being associated with a Border Gateway Protocol (BGP) route and a BGP community tag, where the BGP community tag represents a destination class associated with an attack;
configure, based on the BGP community tag, the network device with a policy that assigns the BGP route to the destination class associated with the attack;
receive a data packet via one of the plurality of input interfaces;
determine, in response to configuring the network device with the policy, whether the data packet is destined for the attack target;
change a count value when the data packet is destined for the attack target;
filter data received on at least one interface, of the plurality of input interfaces, identified, by the count value, as a source of the attack; and
forward information regarding data packets destined for the attack target to an external device, the information regarding data packets identifying an amount of traffic, destined for the attack target, received at the at least one interface, of the plurality of input interfaces.

19. The network device of claim 18, where logic is further to:
identify the source of the attack based on the count value.

20. A network device for identifying a source of an attack in a network, comprising:
a plurality of input interfaces; and
logic, implemented at least partially in hardware, to:
receive a Border Gateway Protocol (BGP) route that identifies an address of an attack target, the route including a BGP community tag representing a destination class associated with the attack;
configure, based on the BGP community tag, the network device with a policy that assigns the BGP route to the destination class associated with the attack;
determine, in response to configuring the network device with the policy, if data is destined for the attack target;
monitor, based on the destination class and for each input interface of a plurality of input interfaces of the network device, data destined for the attack target;
determine a potential source of the attack based on the monitoring, the potential source of the attack being associated with at least one input interface, of the plurality of input interfaces; and
filter data received on the at least one input interface, of the plurality of input interfaces.

* * * * *